United States Patent
Li et al.

(10) Patent No.: US 12,067,181 B2
(45) Date of Patent: Aug. 20, 2024

(54) TOUCH PANEL, MANUFACTURING METHOD THEREOF, AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Yangjie Li, Beijing (CN); Zhongzheng Yang, Beijing (CN); Yu Jiang, Beijing (CN); Zhanqi Xu, Beijing (CN); Ting Zeng, Beijing (CN); Liuyue Yin, Beijing (CN); Haifeng Hu, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/910,025

(22) PCT Filed: Oct. 19, 2021

(86) PCT No.: PCT/CN2021/124686
§ 371 (c)(1),
(2) Date: Sep. 8, 2022

(87) PCT Pub. No.: WO2022/111136
PCT Pub. Date: Jun. 2, 2022

(65) Prior Publication Data
US 2023/0116411 A1     Apr. 13, 2023

(30) Foreign Application Priority Data

Nov. 26, 2020 (CN) .......................... 202011349434.4

(51) Int. Cl.
G06F 3/044    (2006.01)
G06F 3/041    (2006.01)
G06F 3/042    (2006.01)

(52) U.S. Cl.
CPC .......... G06F 3/0412 (2013.01); G06F 3/0446 (2019.05); G06F 3/0421 (2013.01);
(Continued)

(58) Field of Classification Search
CPC .... G06F 3/0412; G06F 3/0446; G06F 3/0443; G06F 3/0421; G06F 2203/04103; G06F 2203/04111
See application file for complete search history.

(56) References Cited

U.S. PATENT DOCUMENTS 10,980,110 B2   4/2021   Fan et al.
2014/0182888 A1  7/2014  Chuang et al.
(Continued)

FOREIGN PATENT DOCUMENTS

CN    104635991 A    5/2015
CN    104766647 A    7/2015
(Continued)

Primary Examiner — Adam J Snyder
(74) Attorney, Agent, or Firm — HOUTTEMAN LAW LLC

(57) ABSTRACT

A touch panel, a manufacturing method thereof and a display device, which belong to the field of display technology, are disclosed. The touch panel includes a substrate (1), and a first light-transmitting insulation layer (2), a touch structure (3), and a second light-transmitting insulation layer (4), which are sequentially disposed on the substrate (1); the touch structure (3) includes a first touch layer (31), a third light-transmitting insulation layer (32), and a second touch layer (33), which are sequentially stacked; a refractive index of the first light-transmitting insulation layer (2) is greater than that of the third light-transmitting insulation layer (32); and a refractive index of the third light-transmitting insulation layer (32) is greater than that of the second light-transmitting insulation layer (4).

17 Claims, 5 Drawing Sheets

(52) U.S. Cl.
   CPC .. *G06F 3/0443* (2019.05); *G06F 2203/04103* (2013.01); *G06F 2203/04111* (2013.01)

(56) References Cited

U.S. PATENT DOCUMENTS

| | | | |
|---|---|---|---|
| 2015/0036062 A1* | 2/2015 | Chien | G06F 3/0421 349/12 |
| 2016/0007438 A1* | 1/2016 | Hsu | G06F 3/044 174/268 |
| 2022/0121301 A1* | 4/2022 | Son | G06F 3/0412 |

FOREIGN PATENT DOCUMENTS

| | | | | |
|---|---|---|---|---|
| CN | 105677097 A | | 6/2016 | |
| CN | 106814897 A | | 6/2017 | |
| CN | 106919284 A | | 7/2017 | |
| CN | 107491226 A | * | 12/2017 | ............... G02B 1/14 |
| CN | 206864197 U | | 1/2018 | |
| CN | 207380686 U | | 5/2018 | |
| CN | 108255349 A | | 7/2018 | |
| CN | 108376041 A | | 8/2018 | |
| CN | 213844091 U | | 7/2021 | |
| JP | 2795573 B2 | | 9/1998 | |
| JP | 2006225004 A | | 8/2006 | |
| KR | 1020150072492 A | * | 6/2015 | ............... G02B 1/14 |
| TW | M474967 U | | 3/2014 | |
| WO | WO-2014021657 A1 | * | 2/2014 | ............. G06F 3/044 |
| WO | WO-2014098406 A1 | * | 6/2014 | ............. G02B 1/11 |

\* cited by examiner

TOUCH PANEL, MANUFACTURING METHOD THEREOF, AND DISPLAY DEVICE

CROSS-REFERENCE TO RELATED APPLICATION

This is a National Phase Application filed under 35 U.S.C. 371 as a national stage of PCT/CN2021/124686, filed on Oct. 19, 2021, the contents of which are incorporated herein in their entirety by reference.

TECHNICAL FIELD

Embodiments of the present disclosure belong to the field of display technology, and particularly relate to a touch panel, a manufacturing method thereof, and a display device.

BACKGROUND

Nowadays, private cars become more and more common, and consumers' demands on vehicle-mounted products become higher and higher. In the field of vehicle-mounted display and touch control products, manufacturers are competing for high resolution, highly sensitive touch control and good visual effects in various environments. Due to safety and reliability requirements of the vehicle-mounted products, quality tests for the vehicle-mounted products are stricter than those for general consumer goods.

Most vehicle-mounted touch products adopt add-on touch panels (such as One Glass Solution, OGS) based on the mutual capacitance principle, and the touch panels based on the mutual capacitance principle are formed with a plurality of bridge-point electrode structures. When the touch panels are used in the sun, a phenomenon that bridge points are bright in the sun cannot be avoided, which affects users' sight to certain extent. Since any slight influence may be fatal when a vehicle is moving at a high speed, customers' requirement for invisibility of the bridge points of the vehicle-mounted touch control products is extremely high.

SUMMARY

The embodiments of the present disclosure provide a touch panel, a manufacturing method thereof and a display device.

In a first aspect, an embodiment of the present disclosure provides a touch panel, including a substrate, and a first light-transmitting insulation layer, a touch structure, and a second light-transmitting insulation layer, which are sequentially disposed on the substrate. The touch structure includes a first touch layer, a third light-transmitting insulation layer, and a second touch layer, which are sequentially stacked. A refractive index of the first light-transmitting insulation layer is greater than a refractive index of the third light-transmitting insulation layer; and a refractive index of the third light-transmitting insulation layer is greater than a refractive index of the second light-transmitting insulation layer.

In some embodiments, the refractive index of the first light-transmitting insulation layer is smaller than a refractive index of the first touch layer.

In some embodiments, the refractive index of the third light-transmitting insulation layer ranges from 1.65 to 1.75.

In some embodiments, a range of the refractive index of the first light-transmitting insulation layer is 1.75±0.03; a range of the refractive index of the third light-transmitting insulation layer is 1.7±0.2; and a range of the refractive index of the second light-transmitting insulation layer is 1.65±0.03.

In some embodiments, the third light-transmitting insulation layer is made of an organic insulation material, and a thickness range of the third light-transmitting insulation layer is 1.5 μm±0.15 μm.

In some embodiments, the first light-transmitting insulation layer is made of an inorganic insulation material, and a thickness range of the first light-transmitting insulation layer is 800 Å±30 Å.

In some embodiments, the second light-transmitting insulation layer is made of an inorganic insulation material, and a thickness range of the second light-transmitting insulation layer is 900 Å±30 Å.

In some embodiments, both the first light-transmitting insulation layer and the second light-transmitting insulation layer are made of a silicon oxynitride material.

In some embodiments, both the first touch layer and the second touch layer are made of a light-transmitting conductive material; and a range of the refractive index of the first touch layer is 1.85±0.2.

In some embodiments, the first touch layer is closer to the substrate than the second touch layer; or, the second touch layer is closer to the substrate than the first touch layer; and a thickness range of the first touch layer is 1200 Å±30 Å.

In some embodiments, a thickness range of the second touch layer is 250 Å±30 Å.

In some embodiments, the third light-transmitting insulation layer is in a shape of rectangular block, and a slope angle is formed at a periphery of the third light-transmitting insulation layer, and an angle range of the slope angle is from 20 degrees to 30 degrees; an extending distance, along a direction from an edge of the rectangular block to a center of the rectangular block, of an orthographic projection of a slope surface of the slope angle on a horizontal plane is in a range of 4.5 μm to 5 μm; and a length of the slope surface of the slope angle along the direction from the edge of the rectangular block to the center of the rectangular block is in a range of 5 μm to 5.5 μm.

In some embodiments, the second touch layer includes a plurality of driving electrode strips extending in a first direction and a plurality of sensing electrodes arranged in a second direction; the first touch layer includes a plurality of bridge parts arranged in the second direction; the bridge parts are on a side of the third light-transmitting insulation layer facing away from the second touch layer, and each of the bridge parts extends in the second direction and is connected to adjacent sensing electrodes, thus forming a plurality of sensing electrode strips extending in the second direction; and the first direction and the second direction intersect with each other, and the driving electrode strips and the sensing electrode strips spatially intersect and are insulated from each other.

In some embodiments, the touch panel further includes a fourth light-transmitting insulation layer on a side of the second light-transmitting insulation layer away from the substrate; and the fourth light-transmitting insulation layer is made of an organic insulation material.

In some embodiments, a surface of the fourth light-transmitting insulation layer facing away from the second light-transmitting insulation layer is a first surface; and a surface of the first light-transmitting insulation layer facing away from the substrate is a second surface; and a distance between a part of the first surface corresponding to the bridge part and the second surface is greater than a distance between other part of the first surface corresponding to other region than the bridge parts and the second surface.

In some embodiments, a range of a refractive index of the fourth light-transmitting insulation layer is 1.53±0.2; and a thickness range of the fourth light-transmitting insulation layer is 2 μm±0.15 μm.

In a second aspect, an embodiment of the present disclosure further provides a display device, including a display panel, and the touch panel described above; and the touch panel is on a display side of the display panel.

In some embodiments, the display device further includes an optical adhesive layer, through which the touch panel and the display panel are attached together.

In a third aspect, an embodiment of the present disclosure further provides a manufacturing method of a touch panel, including: sequentially forming a first light-transmitting insulation layer, a touch structure and a second light-transmitting insulation layer on a substrate. Forming the touch structure includes sequentially forming a first touch layer, a third light-transmitting insulation layer and a second touch layer. A refractive index of the first light-transmitting insulation layer is greater than a refractive index of the third light-transmitting insulation layer; and a refractive index of the third light-transmitting insulation layer is greater than a refractive index of the second light-transmitting insulation layer.

BRIEF DESCRIPTION OF DRAWINGS

The accompanying drawings are used to provide a further understanding of the present disclosure, and constitute a part of the specification. The drawings are used to explain the present disclosure in conjunction with the embodiments of the present disclosure, but do not constitute any limitation to the present disclosure. The above and other features and advantages will become more apparent to those of ordinary skill in the art through the description of specific exemplary embodiments with reference to the drawings. In the drawings.

Figure 1:
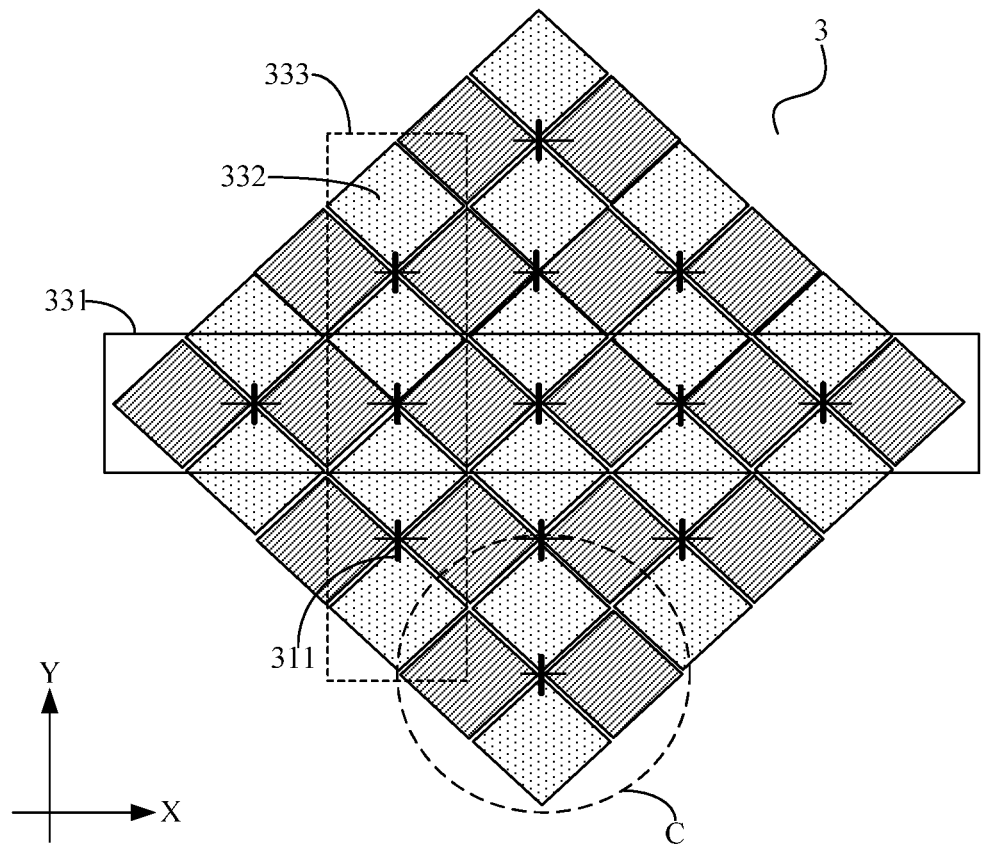
FIG. 1 is a top view of a touch panel according to an embodiment of the present disclosure.
Figure 2:
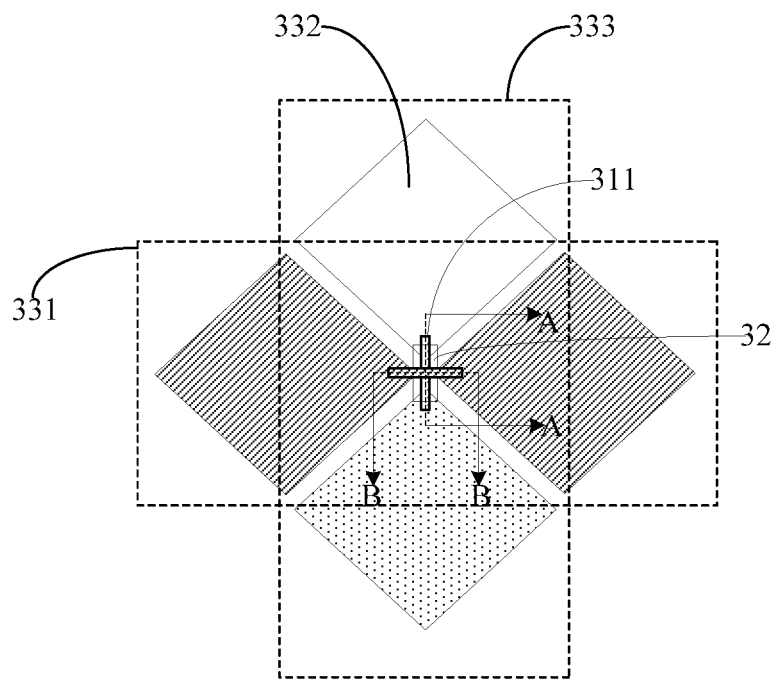
FIG. 2 is an enlarged view of portion C of the touch panel shown in FIG. 1 viewed from a side of a substrate away from a touch structure.
Figure 3:
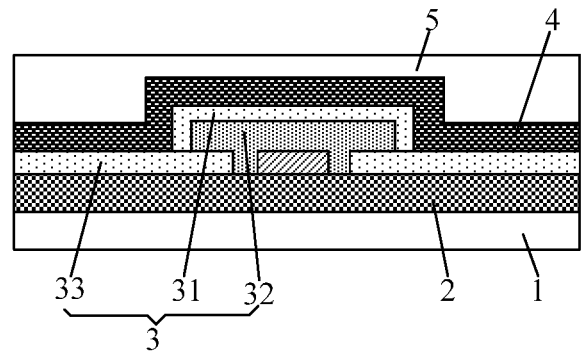
FIG. 3 is a sectional view of the touch panel shown in FIG. 2 taken along line AA.
Figure 4:
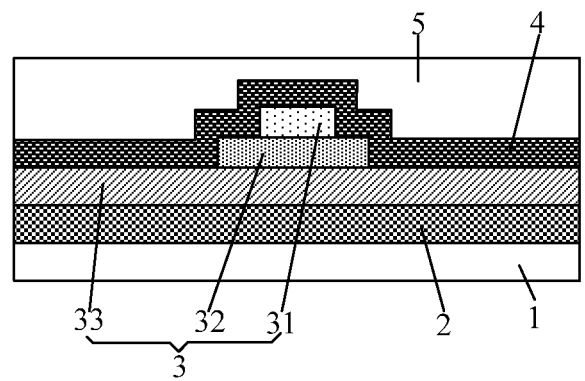
FIG. 4 is a sectional view of the touch panel shown in FIG. 2 taken along line BB.

The reference numerals in the drawings are:
1. substrate; 2. first light-transmitting insulation layer; 3. touch structure; 4. second light-transmitting insulation layer; 31. first touch layer; 32. third light-transmitting insulation layer; 33. second touch layer; 331. driving electrode strip; 332. sensing electrode; 333. sensing electrode strip; 311. bridge part; 5. fourth light-transmitting insulation layer; 6. display panel; 61. base substrate; 62. array substrate; 7. touch panel; 8. optical adhesive layer; 9. liquid crystal.

DETAIL DESCRIPTION OF EMBODIMENTS

In order to enable those of ordinary skill in the art to better understand the technical solutions of the present disclosure, the touch panel, the manufacturing method thereof, and the display device provided by the embodiments of the present disclosure are further described in detail below with reference to the drawings and specific implementations.

The embodiments of the present disclosure will be described more fully below with reference to the drawings, but the embodiments illustrated herein may be embodied in different forms and should not be interpreted as being limited to the embodiments described herein. Rather, the embodiments are provided to make the present disclosure thorough and complete, and are intended to enable those of ordinary skill in the art to fully understand the scope of the present disclosure.

The embodiments of the present disclosure are not limited to those illustrated by the drawings, but include modifications to configuration formed based on the manufacturing process. Thus, the regions shown in the drawings are illustrative, and the shapes of the regions shown in the drawings illustrate specific shapes of the regions, but are not intended to make limitations.

In the related art, the touch panel based on the mutual capacitance principle generally includes a plurality of first electrode strips extending in a first direction and a plurality of second electrode strips extending in a second direction, each first electrode strip is formed by connecting a plurality of first electrode blocks together through first bridge parts, each second electrode strip is formed by connecting a plurality of second electrode blocks together through second bridge parts, the first direction and the second direction intersect with each other, and the first bridge parts and the second bridge parts intersect spatially and are insulated from each other, so that the first bridge parts or the second bridge parts are usually disposed in a layer different from layers of the first electrode blocks and the second electrode blocks, thus forming a plurality of bridge points on the touch panel.

The first electrode strips and the second electrode strips on the touch panel are both made of indium tin oxide, which is a medium with a high refractive index (the refractive index n=1.85). For the touch panel added onto a liquid crystal display module at its display side, the electrode blocks, the bridge parts, and light-transmitting insulation layers between the bridge parts and the electrode blocks are significantly different in reflection spectrum at the positions of the bridge points due to thin-film interference of light, resulting in visual differences of human eyes, and clear visibility of the bridge points.

In order to solve the problem that the bridge points are clearly visible due to reflected light at the positions of the bridge points on the touch panel, an embodiment of the present disclosure provides a touch panel. As shown in FIG. 1 to FIG. 4, the touch panel includes a substrate 1, and a first light-transmitting insulation layer 2, a touch structure 3, and a second light-transmitting insulation layer 4, which are sequentially disposed on the substrate 1; the touch structure 3 includes a first touch layer 31, a third light-transmitting insulation layer 32, and a second touch layer 33, which are sequentially stacked; a refractive index of the first light-transmitting insulation layer 2 is greater than that of the third light-transmitting insulation layer 32; and the refractive index of the third light-transmitting insulation layer 32 is greater than that of the second light-transmitting insulation layer 4.

In some embodiments, the refractive index of the first light-transmitting insulation layer 2 is smaller than that of the first touch layer 31. In some embodiments, a range of the refractive index of the third light-transmitting insulation layer 32 is from 1.65 to 1.75.

In some embodiments, a range of the refractive index of the first light-transmitting insulation layer 2 is 1.75±0.03 (that is, from (1.73−0.03) to (1.75+0.03)); a range of the refractive index of the third light-transmitting insulation layer 32 is 1.7±0.2; and a range of the refractive index of the second light-transmitting insulation layer 4 is 1.65±0.03. In some embodiments, the refractive index of the first touch layer 31 is about 1.85.

It is found by optical simulation that reflectivity of the third light-transmitting insulation layer 32 is the minimum and is 5.42% when the refractive index of the third light-transmitting insulation layer 32 is 1.7; the reflectivity of the third light-transmitting insulation layer 32 is 6.82% when the refractive index of the third light-transmitting insulation layer 32 is 1.53; the reflectivity of the third light-transmitting insulation layer 32 is 6.5% when the refractive index of the third light-transmitting insulation layer 32 is 1.6; the reflectivity of the third light-transmitting insulation layer 32 is 6.1% when the refractive index of the third light-transmitting insulation layer 32 is 1.65; that is, a vanishing effect achieved by the third light-transmitting insulation layer 32 is the best when the refractive index of the third light-transmitting insulation layer 32 is 1.7, and the vanishing effect achieved by the third light-transmitting insulation layer 32 is good when the refractive index of the third light-transmitting insulation layer 32 is in the range of 1.65 to 1.75.

The second touch layer 33 includes a plurality of driving electrode strips 331 extending in a first direction X and a plurality of sensing electrodes 332 arranged in a second direction Y; the first touch layer 31 includes a plurality of bridge parts 311 arranged in the second direction Y; the bridge parts 311 are disposed on a side of the third light-transmitting insulation layer 32 away from the second touch layer 33, and each bridge part 311 extends in the second direction Y and is connected to adjacent sensing electrodes 332, thus forming a plurality of sensing electrode strips 333 extending in the second direction Y; and the first direction X and the second direction Y intersect with each other, and the driving electrode strips 331 and the sensing electrode strips 333 spatially intersect with and are insulated from each other. In this way, the driving electrode strips 331 and the sensing electrode strips 333 spatially intersect at the positions of the bridge parts 311.

In the above embodiments, the refractive index of the third light-transmitting insulation layer 32 is adjusted from original 1.53 to 1.7±0.2, and at the same time, the range of the refractive index of the first light-transmitting insulation layer 2 is 1.75±0.03, and the range of the refractive index of the second light-transmitting insulation layer 4 is 1.65±0.03, so that reflectivity of the bridge parts 311 can be reduced by 1.15%, and the reflectivity of regions of the third light-transmitting insulation layer 32 at the positions of the bridge parts 311 can be reduced by 1.4%, thereby changing an overall vanishing level at the positions of the bridge parts 311 from the fourth level to the second level.

In some embodiments, when an incident light of the touch panel has a wavelength within a visible light wavelength range, the range of the refractive index of the third light-transmitting insulation layer 32 is about 1.7; and when the incident light of the touch panel has a wavelength of 633 nm, the refractive index of the third light-transmitting insulation layer 32 is 1.71.

By disposing the first light-transmitting insulation layer 2 on a side of the touch structure 3 close to the substrate 1 and disposing the second light-transmitting insulation layer 4 on a side of the touch structure 3 away from the substrate 1, a reflection spectrum of the first touch layer 31, a reflection spectrum of the third light-transmitting insulation layer 32 and a reflection spectrum of the second touch layer 33 at the positions of the bridge parts 311 can be made approximate to each other based on the optical interference principle, so that the visual differences of the human eyes at the positions of the bridge parts 311 can be alleviated. Based on the above, the reflection spectra of the first touch layer 31, the third light-transmitting insulation layer 32 and the second touch layer 33 at the positions of the bridge parts 311 can be further made approximate to each other (that is, a reflectivity difference $\Delta R0$ among the first touch layer 31, the third light-transmitting insulation layer 32 and the second touch layer 33 satisfies $\Delta R0 \approx 0$) by setting the range of the refractive index of the third light-transmitting insulation layer 32 to be from 1.65 to 1.75, so that the visual differences of the human eyes at the positions of the bridge parts 311 can be further alleviated, and patterns of the first touch layer 31, the third light-transmitting insulation layer 32 and the second touch layer 33 at the positions of the bridge parts 311 are invisible, thereby better realizing invisibility of the first touch layer 31, the third light-transmitting insulation layer 32 and the second touch layer 33 at the positions of the bridge parts 311, and improving an visual effect of the human eyes.

It should be noted that the configuration of the first touch layer and the second touch layer in the touch structure is not limited to that in the above embodiments. It may be the case that the first touch layer is composed of the driving electrode strips, and the second touch layer is composed of the sensing electrode strips; and it may also the case that the first touch layer is composed of the sensing electrode strips, and the second touch layer is composed of the driving electrode strips.

In some embodiments, the third light-transmitting insulation layer 32 is made of an organic insulation material, such as an acrylic resin material, and an organic insulation material with a relatively high refractive index may be obtained by adjusting types and proportions of components in the material. A thickness range of the third light-transmitting insulation layer 32 is 1.5 μm±0.15 μm. The settings of the range of the refractive index and the thickness range of the third light-transmitting insulation layer 32 facilitate invisibility of the first touch layer 31, the third light-transmitting insulation layer 32 and the second touch layer 33 at the positions of the bridge parts 311.

In some embodiments, the first light-transmitting insulation layer 2 is made of an inorganic insulation material, and a thickness range of the first light-transmitting insulation layer 2 is 800 Å±30 Å. The setting of the thickness range of the first light-transmitting insulation layer 2 facilitates invisibility of the first touch layer 31, the third light-transmitting insulation layer 32 and the second touch layer 33 at the positions of the bridge parts 311.

In some embodiments, the second light-transmitting insulation layer 4 is made of an inorganic insulation material, and a thickness range of the second light-transmitting insulation layer 4 is 900 Å±30 Å.

In some embodiments, both the first light-transmitting insulation layer 2 and the second light-transmitting insulation layer 4 are made of a silicon oxynitride material.

The settings of the range of the refractive index, the thickness range, and the material of the first light-transmitting insulation layer 2 and the settings of the range of the refractive index, the thickness range, and the material of the second light-transmitting insulation layer 4 can realize good invisibility of the pattern of the second touch layer 33 based on the optical interference principle, thereby improving the visual effect of the human eyes.

In some embodiments, both the first touch layer 31 and the second touch layer 33 are made of a light-transmitting conductive material; and a range of the refractive index of the first touch layer 31 is 1.85±0.2. In some embodiments, both the first touch layer 31 and the second touch layer 33 are made of an indium tin oxide material.

In some embodiments, the second touch layer 33 is closer to the substrate 1 than the first touch layer 31; a thickness range of the first touch layer 31 is 1200 Å±30 Å. In some embodiments, a thickness range of the second touch layer 33 is 250 Å±30 Å.

In the above embodiments of the present disclosure, based on the above materials and thickness ranges of the first touch layer 31 and the second touch layer 33, by setting the refractive indexes, the thicknesses, and the materials of the first light-transmitting insulation layer 2 and the second light-transmitting insulation layer 4 according to the embodiments, the invisibility of the pattern of the second touch layer 33 can be well realized based on the optical interference principle; moreover, by setting the refractive index, the thickness and the material of the third light-transmitting insulation layer 32 according to the embodiments, the invisibility of the first touch layer 31, the third light-transmitting insulation layer 32 and the second touch layer 33 at the positions of the bridge parts 311 can be further realized based on the optical interference principle, thereby improving the visual effect of the human eyes.

Figure 5:
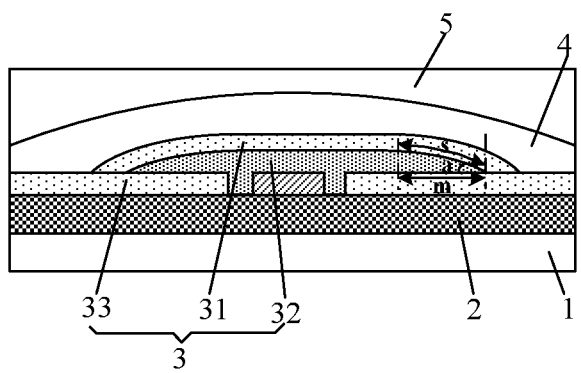
FIG. 5 is another sectional view of the touch panel shown in FIG. 2 taken along the line AA.

In some embodiments, as shown in FIG. 5, the third light-transmitting insulation layer 32 is in a shape of rectangular block, and a slope angle α is formed at the periphery of the third light-transmitting insulation layer 32, and an angle range of the slope angle a is from 20 degrees to 30 degrees; an extending distance m, along a direction from an edge of the rectangular block to a center of the rectangular block, of an orthographic projection of a slope surface of the slope angle α on the horizontal plane is in a range of 4.5 µm to 5 µm; and a length s of the slope surface of the slope angle a along the direction from the edge of the rectangular block to the center of the rectangular block is in a range of 5 µm to 5.5 µm. With the slope angle α and the length s such set, a refraction effect on the light at the periphery of the third light-transmitting insulation layer 32 occurs slowly and gradually, thereby further enhancing a vanishing effect of the first touch layer 31, the third light-transmitting insulation layer 32 and the second touch layer 33 at the positions of the bridge parts 331.

In some embodiments, the length s of the slope surface of the slope angle α along the direction from the edge of the rectangular block to the center of the rectangular block is 5 µm, a maximum distance between the slope surface and the horizontal plane is 1.5 µm, and the extending distance m, along the direction from the edge of the rectangular block to the center of the rectangular block, of the orthographic projection of the slope surface of the slope angle α on the horizontal plane is 4.6 µm.

In some embodiments, the touch panel further includes a fourth light-transmitting insulation layer 5 disposed on a side of the second light-transmitting insulation layer 4 away from the substrate 1; and the fourth light-transmitting insulation layer 5 is made of an organic insulation material, such as an acrylic resin material.

Figure 6:
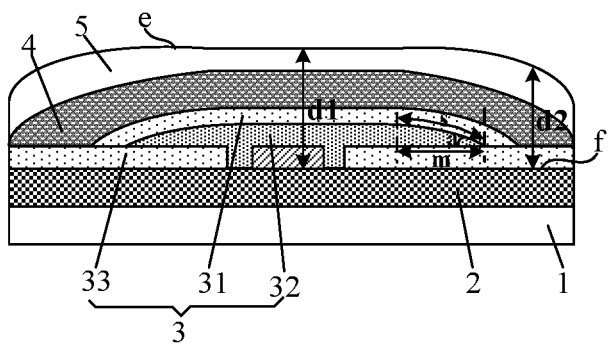
FIG. 6 is still another sectional view of the touch panel shown in FIG. 2 taken along the line AA.
Figure 7:
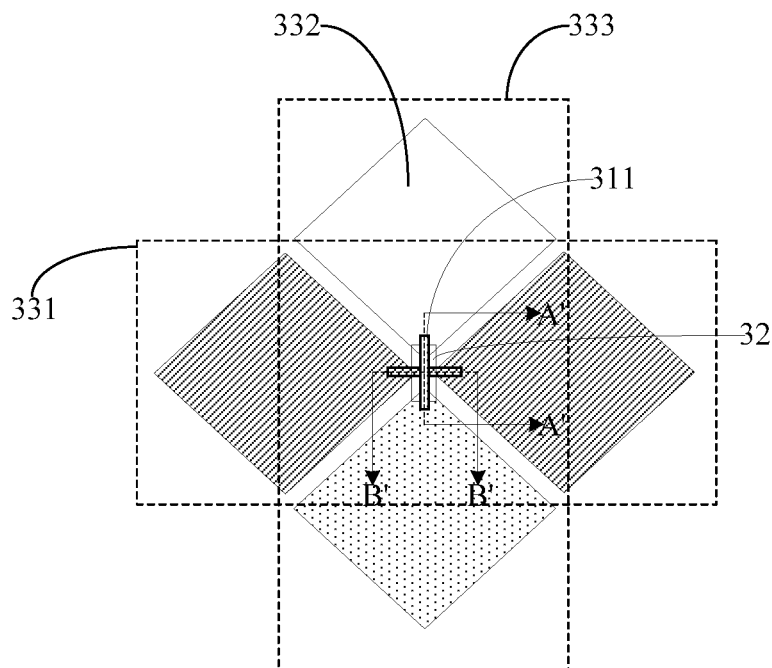
FIG. 7 is another enlarged view of the portion C of the touch panel shown in FIG. 1 viewed from the side of the substrate away from the touch structure.
Figure 8:
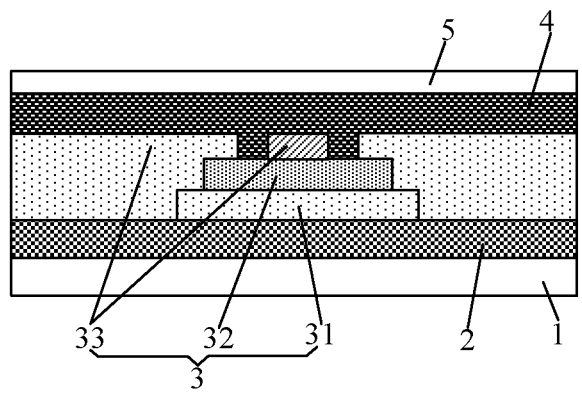
FIG. 8 is a sectional view of the touch panel shown in FIG. 7 taken along line A'A'.
Figure 9:
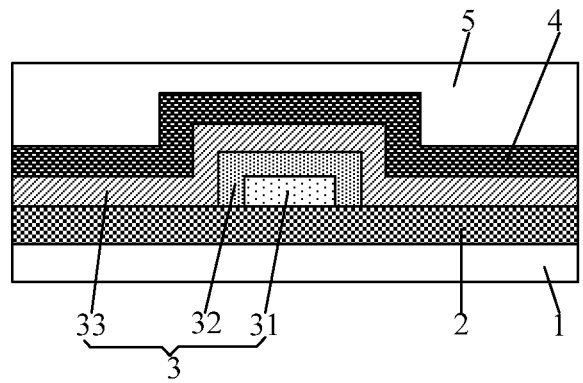
FIG. 9 is a sectional view of the touch panel shown in FIG. 7 taken along line B'B'.

In some embodiments, as shown in FIG. 6, a surface of the fourth light-transmitting insulation layer 5 away from the second light-transmitting insulation layer 4 is a first surface e; a surface of the first light-transmitting insulation layer 2 away from the substrate 1 is a second surface f; and a distance d1 between a part of the first surface e corresponding to a bridge part 311 and the second surface f is greater than a distance d2 between the other part of the first surface e corresponding to the other region than the bridge parts 311 and the second surface f. With such setting, a length of a propagation path of the light incident into the touch panel at the position of the bridge part 311 is greater than a length of a propagation path of the light in the other region than the positions of the bridge parts 311, so that a decrement of the light at the position of the bridge part 311 can be increased, thereby further enhancing the vanishing effect of the first touch layer 31, the third light-transmitting insulation layer 32 and the second touch layer 33 at the positions of the bridge parts 311.

In some embodiments, a range of the refractive index of the fourth light-transmitting insulation layer 5 is 1.53±0.2; and a thickness range of the fourth light-transmitting insulation layer 5 is 2 µm±0.15 µm. The fourth light-transmitting insulation layer 5 enables a surface of the touch panel, which is to be attached to a display panel, to be substantially flat, so as to facilitate improving touch performance of the touch panel.

Based on the above structure of the touch panel, an embodiment of the present disclosure further provides a manufacturing method of the touch panel, including: sequentially forming the first light-transmitting insulation layer, the touch structure and the second light-transmitting insulation layer on the substrate; forming the touch control structure includes sequentially forming the first touch layer, the third light-transmitting insulation layer and the second touch layer; the refractive index of the first light-transmitting insulation layer is greater than that of the third light-transmitting insulation layer; and the refractive index of the third light-transmitting insulation layer is greater than that of the second light-transmitting insulation layer.

Forming the first light-transmitting insulation layer includes: forming the first light-transmitting insulation layer from a silicon oxynitride material by a magnetron sputtering process; and controlling a flow rate of nitrogen introduced into a process chamber to be 150 sccm±10 sccm, and controlling a flow rate of oxygen introduced into the process chamber to be 84 sccm±10 sccm.

A specific manufacturing process of the first light-transmitting insulation layer is: forming the first light-transmitting insulation layer from the silicon oxynitride material by means of magnetron sputtering. In a magnetron sputtering process chamber, a silicon (Si) target is taken as the target to be rotated in the chamber, a glass substrate is clamped on a carrier and moved in the chamber, nitrogen and oxygen in a set proportion are introduced into the chamber, plasma bombards the target, crystals are deposited on a coating surface of the glass substrate, a deposition thickness of the first light-transmitting insulation layer is controlled by controlling the power (18 KW→900 A, 14 KW→800 A) at which the plasma bombards the target and the speed at which the glass substrate moves, and the refractive index of the first light-transmitting insulation layer is controlled by controlling a flow ratio (150 sccm/84 sccm→n=1.75) of nitrogen to oxygen introduced into the chamber. For example, by controlling the power at which the plasma bombards the target to be 18 KW and controlling the speed at which the glass substrate moves to be 1.7 m/min, the first light-transmitting insulation layer with a thickness of 900 Å may be formed; and by controlling the power at which the plasma bombards the target to be 14 KW and controlling the speed at which the glass substrate moves to be 1.7 m/min, the first light-transmitting insulation layer with a thickness of 800 Å may be formed. By controlling the flow ratio of nitrogen to oxygen introduced into the chamber to be 150 sccm/84 sccm, the first light-transmitting insulation layer with a refractive index of 1.75 may be formed.

In some embodiments, a manufacturing process of the second light-transmitting insulation layer is the same as that of the first light-transmitting insulation layer: the second light-transmitting insulation layer with a corresponding refractive index is formed by controlling the flow ratio of nitrogen to oxygen introduced into the chamber; and the second light-transmitting insulation layer with a corresponding thickness is formed by controlling the power at which the plasma bombards the target and the speed at which the glass substrate moves.

In some embodiments, the third light-transmitting insulation layer is formed by a coating process. By controlling composition of the material of the third light-transmitting insulation layer, the third light-transmitting insulation layer with a corresponding refractive index may be formed; and by controlling the types and the proportions of the components in the organic insulation material, the third light-transmitting insulation layer with a relatively high refractive index may be formed. By controlling a coating speed and a discharge amount of a material to be coated in the coating process, the third light-transmitting insulation layer with a corresponding thickness may be formed.

In some embodiments, a manufacturing process of the fourth light-transmitting insulation layer is the same as that of the third light-transmitting insulation layer, and thus will not be described in detail here.

In some embodiments, the first touch layer and the second touch layer are formed by a patterning process (including film formation, exposure, development, etching, and other steps). Since the patterning process is a relatively mature process, the patterning process will not be described in detail here.

An embodiment of the present disclosure further provides a touch panel, which is different from the touch panel provided by the above embodiments in that the range of the refractive index of the first light-transmitting insulation layer is 1.65±0.03; the range of the refractive index of the third light-transmitting insulation layer is 1.53±0.2; and the range of the refractive index of the second light-transmitting insulation layer is 1.65±0.03.

In the present embodiment, the thickness and the material of the first light-transmitting insulation layer, and the refractive indexes, the thicknesses, and the materials of the other structures in the touch panel are all the same as those described in the above embodiments.

In the present embodiment, the refractive index of the first light-transmitting insulation layer is adjusted from 1.75 described in the above embodiments to 1.65±0.03, and at the same time, the range of the refractive index of the third light-transmitting insulation layer 32 is 1.53±0.2, and the range of the refractive index of the second light-transmitting insulation layer is 1.65±0.03, so that the reflectivity of the bridge parts can be reduced by 0.6%, and the reflectivity of the regions of the third light-transmitting insulation layer at the positions of the bridge parts can be reduced by 0.98%, thereby decreasing the overall vanishing level at the positions of the bridge parts 311 from the fourth level to the third level.

In the embodiments of the present disclosure, the settings of the range of the refractive index and the thickness range of the first light-transmitting insulation layer facilitate the invisibility of the first touch layer, the third light-transmitting insulation layer and the second touch layer at the positions of the bridge parts. In addition, the settings of the range of the refractive index, the thickness range and the material of the first light-transmitting insulation layer and the settings of the range of the refractive index, the thickness range and the material of the second light-transmitting insulation layer can well realize the invisibility of the pattern of the second touch layer based on the optical interference principle, thereby improving the visual effect of the human eyes.

The present embodiment further provides a manufacturing method of a touch panel, which is different from the method described in the above embodiments in that, when the first light-transmitting insulation layer is formed, the flow rate of nitrogen introduced into the process chamber is controlled to be 95 sccm±10 sccm, and the flow rate of oxygen introduced into the process chamber is controlled to be 75 sccm±10 sccm, so as to form the first light-transmitting insulation layer with a range of the refractive index of 1.65±0.03. If the flow ratio of nitrogen to oxygen introduced into the chamber is controlled to be 95 sccm/75 sccm, the first light-transmitting insulation layer with a refractive index of 1.65 may be formed.

In some embodiments, by controlling the composition of the material of the third light-transmitting insulation layer, the third light-transmitting insulation layer with a corresponding refractive index may be formed.

The manufacturing processes of the first light-transmitting insulation layer, the third light-transmitting insulation layer and the other structures in the touch panel in the present embodiment are the same as those described in the above embodiments, and thus will not be described in detail here.

An embodiment of the present disclosure further provides a touch panel, which is different from the touch panel provided by the above embodiments in that the range of the refractive index of the first light-transmitting insulation layer is 1.75±0.03; the range of the refractive index of the third light-transmitting insulation layer is 1.53±0.2; and the range of the refractive index of the second light-transmitting insulation layer is 1.65±0.03.

In the present embodiment, the thickness and the material of the third light-transmitting insulation layer, and the refractive indexes, the thicknesses, and the materials of the other structures in the touch panel are all the same as those described in the above embodiments.

In the embodiments of the present disclosure, by setting the range of the refractive index, the thickness range and the material of the first light-transmitting insulation layer and setting the range of the refractive index, the thickness range and the material of the second light-transmitting insulation layer, the invisibility of the pattern of the second touch layer can be well realized based on the optical interference principle, thereby improving the visual effect of the human eyes. However, since the settings of the ranges of the refractive indexes and the thickness ranges of the first light-transmitting insulation layer, the third light-transmitting insulation layer and the second light-transmitting insulation layer cannot well realize the invisibility of the patterns of the first touch layer, the third light-transmitting insulation layer and the second touch layer at the positions of the bridge parts, the overall vanishing level at the positions of the bridge parts is still the fourth level.

A manufacturing method of a touch panel provided by the present embodiment is the same as those described in the above embodiments, and thus will not be described in detail here.

An embodiment of the present disclosure further provides a touch panel, which is different from the touch panels described in the above embodiments in that the first touch layer 31 is closer to the substrate 1 than the second touch layer 33, as shown in FIG. 7 to FIG. 11.

Figure 10:
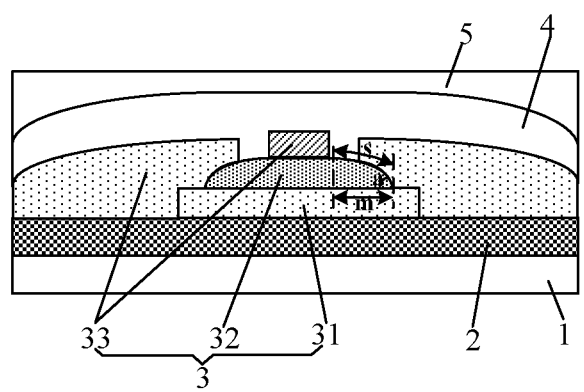
FIG. 10 is another sectional view of the touch panel shown in FIG. 7 taken along the line A'A'.

In some embodiments, as shown in FIG. 10, the third light-transmitting insulation layer 32 is in the shape of rectangular block, and the slope angle a is formed at the periphery of the third light-transmitting insulation layer 32, and the angle range of the slope angle a is from 20 degrees to 30 degrees; the extending distance m, along the direction from the edge of the rectangular block to the center of the rectangular block, of the orthographic projection of the slope surface of the slope angle α on the horizontal plane is in a range of 4.5 μm to 5 μm ; and the length s of the slope surface of the slope angle a along the direction from the edge of the rectangular block to the center of the rectangular block is in a range of 5 μm to 5.5 μm. With the slope angle a and the length s such set, the refraction effect on the light at the periphery of the third light-transmitting insulation layer 32 occurs slowly and gradually, thereby further enhancing the vanishing effect of the first touch layer 31, the third light-transmitting insulation layer 32 and the second touch layer 33 at the positions of the bridge parts 331.

In some embodiments, the length s of the slope surface of the slope angle α along the direction from the edge of the rectangular block to the center of the rectangular block is 5 μm, the maximum distance between the slope surface and the horizontal plane is 1.5 μm, and the extending distance m, along the direction from the edge of the rectangular block to the center of the rectangular block, of the orthographic projection of the slope surface of the slope angle a on the horizontal plane is 4.6 μm.

Figure 11:
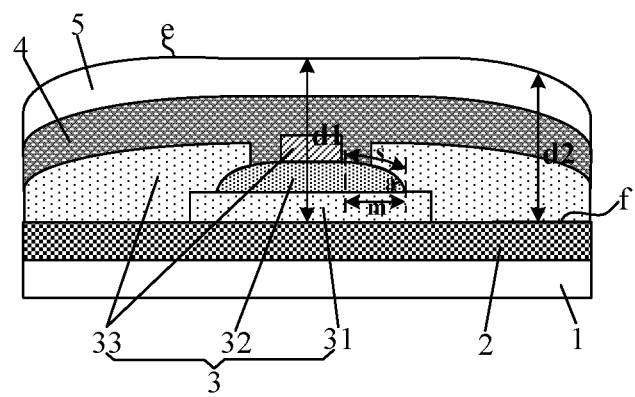
FIG. 11 is still another sectional view of the touch panel shown in FIG. 7 taken along the line A'A'.

In some embodiments, as shown in FIG. 11, the surface of the fourth light-transmitting insulation layer 5 away from the second light-transmitting insulation layer 4 is the first surface e; the surface of the first light-transmitting insulation layer 2 away from the substrate 1 is the second surface f; and the distance d1 between the part of the first surface e corresponding to a bridge part 311 and the second surface f is greater than the distance d2 between the other part of the first surface e corresponding to the other regions than the bridge part 311 and the second surface f. With such setting, the length of the propagation path of the light incident into the touch panel at the position of the bridge part 311 is greater than the length of the propagation path of the light in the regions except for the positions of the bridge parts 311, so that the decrement of the light at the position of the bridge part 311 can be increased, thereby further enhancing the vanishing effect of the first touch layer 31, the third light-transmitting insulation layer 32 and the second touch layer 33 at the positions of the bridge parts 311.

In the present embodiment, configuration of the other structures in the touch panel and the refractive indexes, the thicknesses and the materials of those structures are the same as those described in the above embodiments, and thus will not be described in detail here.

In a manufacturing method of a touch panel provided by the present embodiment, the first touch layer is first formed on the substrate, and then the second touch layer is formed. Other steps of the manufacturing method of the touch panel and specific manufacturing processes are the same as those described in the above embodiments, and thus will not be described in detail here.

Invisibility data obtained by software simulation in the above embodiments of the present disclosure are shown in Table 1 and Table 2.

TABLE 1

| Region(s) | Stacked structure | Refractive index of first light-transmitting insulation layer: 1.75 Refractive index of second light-transmitting insulation layer: 1.65 Refractive index of third light-transmitting insulation layer: 1.53 | | Refractive index of first light-transmitting insulation layer: 1.65 Refractive index of second light-transmitting insulation layer: 1.65 Refractive index of third light-transmitting insulation layer: 1.53 | | Refractive index of first light-transmitting insulation layer: 1.75 Refractive index of second light-transmitting insulation layer: 1.65 Refractive index of third light-transmitting insulation layer: 1.70 | |
|---|---|---|---|---|---|---|---|
| | | Re % | L | Re % | L | Re % | L |
| ①: Region of pattern of second touch layer | first light-transmitting insulation layer + second touch layer + second light-transmitting insulation layer | 4.78 | 26.00 | 4.78 | 25.50 | 4.78 | 26.00 |

TABLE 1-continued

| Region(s) | Stacked structure | Refractive index of first light-transmitting insulation layer: 1.75; Refractive index of second light-transmitting insulation layer: 1.65; Refractive index of third light-transmitting insulation layer: 1.53 | | Refractive index of first light-transmitting insulation layer: 1.65; Refractive index of second light-transmitting insulation layer: 1.65; Refractive index of third light-transmitting insulation layer: 1.53 | | Refractive index of first light-transmitting insulation layer: 1.75; Refractive index of second light-transmitting insulation layer: 1.65; Refractive index of third light-transmitting insulation layer: 1.70 | |
|---|---|---|---|---|---|---|---|
| | | Re % | L | Re % | L | Re % | L |
| ②: Regions of bridge parts | first light-transmitting insulation layer + first touch layer + third light-transmitting insulation layer + second touch layer + second light-transmitting insulation layer | 6.25 | 30.00 | 5.65 | 27.80 | 5.10 | 26.70 |
| ③: Regions of third light-transmitting insulation layer corresponding to bridge parts | first light-transmitting insulation layer + third light-transmitting insulation layer + second touch layer + second light-transmitting insulation layer | 6.82 | 30.80 | 5.84 | 28.20 | 5.42 | 27.30 |

TABLE 2

| Region(s) | Stacked structure | Refractive index of first light-transmitting insulation layer: 1.75; Refractive index of second light-transmitting insulation layer: 1.65; Refractive index of third light-transmitting insulation layer: 1.65 | | Refractive index of first light-transmitting insulation layer: 1.75; Refractive index of second light-transmitting insulation layer: 1.65; Refractive index of third light-transmitting insulation layer: 1.75 | | Refractive index of first light-transmitting insulation layer: 1.75; Refractive index of second light-transmitting insulation layer: 1.65; Refractive index of third light-transmitting insulation layer: 1.6 | |
|---|---|---|---|---|---|---|---|
| | | Re % | L | Re % | L | Re % | L |
| ①: Region of pattern of second touch layer | first light-transmitting insulation layer + second touch layer + second light-transmitting insulation layer | 4.78 | 26.00 | 4.78 | 26.00 | 4.78 | 26.00 |
| ②: Regions of bridge parts | first light-transmitting insulation layer + first touch layer + third light-transmitting | 5.85 | 27.83 | 5.63 | 27.62 | 6.45 | 29.33 |

TABLE 2-continued

| | | Refractive index of first light-transmitting insulation layer: 1.75 Refractive index of second light-transmitting insulation layer: 1.65 Refractive index of third light-transmitting insulation layer: 1.65 | | Refractive index of first light-transmitting insulation layer: 1.75 Refractive index of second light-transmitting insulation layer: 1.65 Refractive index of third light-transmitting insulation layer: 1.75 | | Refractive index of first light-transmitting insulation layer: 1.75 Refractive index of second light-transmitting insulation layer: 1.65 Refractive index of third light-transmitting insulation layer: 1.6 | |
|---|---|---|---|---|---|---|---|
| Region(s) | Stacked structure | Re % | L | Re % | L | Re % | L |
| ③: Regions of third light-transmitting insulation layer corresponding to bridge parts | insulation layer + second touch layer + second light-transmitting insulation layer first light-transmitting insulation layer + third light-transmitting insulation layer + second touch layer + second light-transmitting insulation layer | 6.1 | 28.49 | 6.07 | 28.17 | 6.5 | 29.52 |

In Table 1 and the Table 2, Re % represents a reflectivity difference of the stacked structures in different regions; and L represents a brightness difference of the stacked structures in different regions. As can be seen from Table 1 and the Table 2, an adjustment to the refractive index of the first light-transmitting insulation layer and an adjustment to the refractive index of the third light-transmitting insulation layer do not greatly change the reflectivity difference and the brightness difference in the region of the pattern of the second touch layer; but the adjustment to the refractive index of the first light-transmitting insulation layer and the adjustment to the refractive index of the third light-transmitting insulation layer significantly reduce the reflectivity difference and the brightness difference in the regions of the bridge parts; and the adjustment to the refractive index of the first light-transmitting insulation layer and the adjustment to the refractive index of the third light-transmitting insulation layer significantly reduce the reflectivity difference and the brightness difference in the regions of the third light-transmitting insulation layer corresponding to the bridge parts, so that the patterns of the first touch layer, the third light-transmitting insulation layer and the second touch layer at the positions of the bridge parts are made invisible, thereby better realizing the invisibility of the first touch layer, the third light-transmitting insulation layer and the second touch layer at the positions of the bridge parts, and improving the visual effect of the human eyes.

In the touch panel provided by the embodiments of the present disclosure, by disposing the first light-transmitting insulation layer on the side of the touch structure close to the substrate and disposing the second light-transmitting insulation layer on the side of the touch structure away from the substrate, the reflection spectra of the first touch layer, the third light-transmitting insulation layer and the second touch layer at the positions of the bridge parts can be made approximate to each other based on the optical interference principle, so that the visual differences of the human eyes at the positions of the bridge parts can be alleviated. Based on the above, by setting the refractive index of the first light-transmitting insulation layer to be greater than that of the third light-transmitting insulation layer and setting the refractive index of the third light-transmitting insulation layer to be greater than that of the second light-transmitting insulation layer in the present embodiment, the reflection spectra of the first touch layer, the third light-transmitting insulation layer and the second touch layer at the positions of the bridge parts can be further made approximate to each other, so that the visual differences of the human eyes at the positions of the bridge parts can be further improved, and the patterns of the first touch layer, the third light-transmitting insulation layer and the second touch layer at the positions of the bridge parts are invisible, thereby better realizing the invisibility of the first touch layer, the third light-transmitting insulation layer and the second touch layer at the positions of the bridge parts, and improving the visual effect of the human eyes.

An embodiment of the present disclosure further provides a display device, including a display panel, and the touch panel according to any one of the above embodiments; and the touch panel is disposed on a display side of the display panel.

Figure 12:
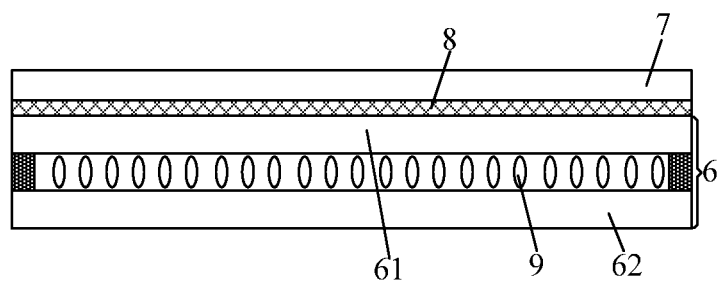
FIG. 12 is a sectional view of a display device according to an embodiment of the present disclosure.

In some embodiments, as shown in FIG. 12, a touch panel 7 may be added onto the display side of a display panel 6 (i.e., Out Cell). For example, the display device further includes an optical adhesive layer 8, through which the touch panel 7 and the display panel 6 are attached together.

Figure 13:
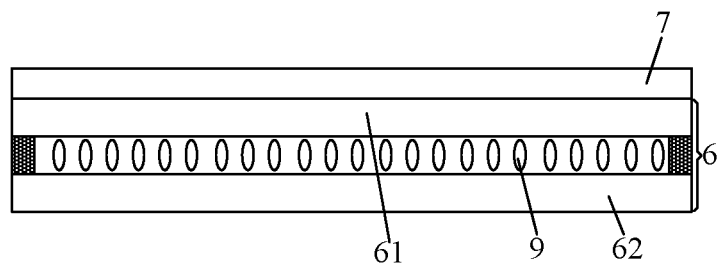
FIG. 13 is another sectional view of a display device according to an embodiment of the present disclosure.
Figure 14:
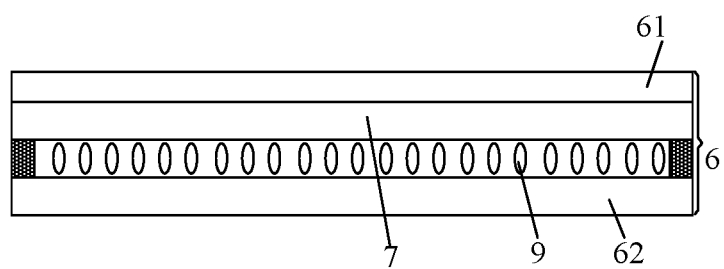
FIG. 14 is still another sectional view of a display device according to an embodiment of the present disclosure.

In some embodiments, as shown in FIG. 13, the touch panel 7 may also be directly integrated with the display panel 6 on the display side of the display panel 6. For example, a substrate of the touch panel 7 is also used as a base substrate 61 of the display panel 6 on the display side of the display panel 6 (i.e., On Cell). As shown In FIG. 14, the touch panel 7 is directly formed inside the display panel 6 (i.e., In Cell).

In some embodiments, the display panel 6 includes a liquid crystal display panel. The display panel 6 further includes an array substrate 62 assembled with the base substrate 61 to form a cell, and a gap between the formed cell is filled with a liquid crystal 9.

By adopting the touch panel provided by any one of the above embodiments, a visual effect of the display device is improved.

The display device provided by the embodiment of the present disclosure may be any product or component with a display function, such as a Liquid Crystal Display (LCD) panel, an LCD TV, an OLED panel, an OLED TV, a display, a mobile phone, or a navigator.

It should be understood that the above embodiments are merely exemplary embodiments adopted to illustrate the principles of the present disclosure, and the present disclosure is not limited thereto. Various modifications and improvements can be made by those of ordinary sill in the art without departing from the spirit and essence of the present disclosure, and those modifications and improvements should also be considered to fall within the scope of the present disclosure.

What is claimed is:

1. A touch panel, comprising a substrate, and a first light-transmitting insulation layer, a touch structure, and a second light-transmitting insulation layer, which are sequentially disposed on the substrate;
   the touch structure comprises a first touch layer, a third light-transmitting insulation layer, and a second touch layer, which are sequentially stacked; and
   a refractive index of the first light-transmitting insulation layer is greater than a refractive index of the third light-transmitting insulation layer; and a refractive index of the third light-transmitting insulation layer is greater than a refractive index of the second light-transmitting insulation layer,
   wherein a range of the refractive index of the first light-transmitting insulation layer is 1.75±0.03; a range of the refractive index of the third light-transmitting insulation layer is from 1.65 to 1.75; and a range of the refractive index of the second light-transmitting insulation layer is 1.65±0.03.

2. The touch panel of claim 1, wherein the refractive index of the first light-transmitting insulation layer is smaller than a refractive index of the first touch layer.

3. The touch panel of claim 2, wherein both the first touch layer and the second touch layer are made of a light-transmitting conductive material; and a range of the refractive index of the first touch layer is 1.85±0.2.

4. The touch panel of claim 3, wherein the first touch layer is closer to the substrate than the second touch layer; or, the second touch layer is closer to the substrate than the first touch layer; and
   a thickness range of the first touch layer is 1200Å±30Å.

5. The touch panel of claim 4, wherein a thickness range of the second touch layer is 250Å±30Å.

6. The touch panel of claim 1, wherein the third light-transmitting insulation layer is made of an organic insulation material, and a thickness range of the third light-transmitting insulation layer is 1.5 μm±0.15 μm.

7. The touch panel of claim 6, wherein the first light-transmitting insulation layer is made of an inorganic insulation material, and a thickness range of the first light-transmitting insulation layer is 800Å±30Å.

8. The touch panel of claim 6, wherein the second light-transmitting insulation layer is made of an inorganic insulation material, and a thickness range of the second light-transmitting insulation layer is 900Å±30Å.

9. The touch panel of claim 1, wherein both the first light-transmitting insulation layer and the second light-transmitting insulation layer are made of a silicon oxynitride material.

10. The touch panel of claim 1, wherein the third light-transmitting insulation layer is in a shape of rectangular block, and a slope angle is formed at a periphery of the third light-transmitting insulation layer, and an angle range of the slope angle is from 20 degrees to 30 degrees;
    an extending distance, along a direction from an edge of the rectangular block to a center of the rectangular block, of an orthographic projection of a slope surface of the slope angle on a horizontal plane is in a range of 4.5 μm to 5 μm; and
    a length of the slope surface of the slope angle along the direction from the edge of the rectangular block to the center of the rectangular block is in a range of 5 μm to 5.5 μm.

11. The touch panel of claim 10, wherein the second touch layer comprises a plurality of driving electrode strips extending in a first direction and a plurality of sensing electrodes arranged in a second direction;
    the first touch layer comprises a plurality of bridge parts arranged in the second direction; the bridge parts are on a side of the third light-transmitting insulation layer facing away from the second touch layer, and each of the bridge parts extends in the second direction and is connected to adjacent sensing electrodes, thus forming a plurality of sensing electrode strips extending in the second direction; and
    the first direction and the second direction intersect with each other, and the driving electrode strips and the sensing electrode strips spatially intersect and are insulated from each other.

12. The touch panel of claim 11, further comprising a fourth light-transmitting insulation layer on a side of the second light-transmitting insulation layer away from the substrate, wherein the fourth light-transmitting insulation layer is made of an organic insulation material.

13. The touch panel of claim 12, wherein a surface of the fourth light-transmitting insulation layer facing away from the second light-transmitting insulation layer is a first surface; and a surface of the first light-transmitting insulation layer facing away from the substrate is a second surface; and
    a distance between a part of the first surface corresponding to the bridge part and the second surface is greater than a distance between other part of the first surface corresponding to other region than the bridge parts and the second surface.

14. The touch panel of claim 12, wherein a range of a refractive index of the fourth light-transmitting insulation layer is 1.53±0.2; and a thickness range of the fourth light-transmitting insulation layer is 2 μm±0.15 μm.

15. A display device, comprising a display panel, and the touch panel of claim 1,
    wherein the touch panel is on a display side of the display panel.

16. The display device of claim 15, further comprising an optical adhesive layer, through which the touch panel and the display panel are attached together.

17. A manufacturing method of a touch panel, comprising:
sequentially forming a first light-transmitting insulation layer, a touch structure and a second light-transmitting insulation layer on a substrate;
wherein forming the touch structure comprises sequentially forming a first touch layer, a third light-transmitting insulation layer and a second touch layer; and
a refractive index of the first light-transmitting insulation layer is greater than a refractive index of the third light-transmitting insulation layer; and a refractive index of the third light-transmitting insulation layer is greater than a refractive index of the second light-transmitting insulation layer.
wherein a range of the refractive index of the first light-transmitting insulation layer is 1.75±0.03; a range of the refractive index of the third light-transmitting insulation layer is from 1.65 to 1.75; and a range of the refractive index of the second light-transmitting insulation layer is 1.65±0.03.

* * * * *